US012423066B2

(12) United States Patent
Balachandran et al.

(10) Patent No.: US 12,423,066 B2
(45) Date of Patent: Sep. 23, 2025

(54) PROGRAMMING MODEL MIGRATION TOOL

(71) Applicant: SAP SE, Walldorf (DE)

(72) Inventors: Shyam Balachandran, Bangalore (IN); Martin Bretzer, Walldorf (DE); Ranzo Colle, Stutensee (DE); Volker Drees, Walldorf (DE); Fabian Fellhauer, Ostringen (DE); Marcel Hermanns, Heidelberg (DE); Tilmann David Kopp, Stutensee (DE); Steffen Mattes, Karlsruhe (DE); Arunkumar S, Bengaluru (DE); Karsten Schaser, Wiesloch (DE)

(73) Assignee: SAP SE, Walldorf (DE)

( * ) Notice: Subject to any disclaimer, the term of this patent is extended or adjusted under 35 U.S.C. 154(b) by 213 days.

(21) Appl. No.: 18/484,038

(22) Filed: Oct. 10, 2023

(65) Prior Publication Data
US 2025/0117196 A1 Apr. 10, 2025

(51) Int. Cl.
*G06F 9/44* (2018.01)
*G06F 8/35* (2018.01)
(52) U.S. Cl.
CPC .................................. *G06F 8/35* (2013.01)

(58) Field of Classification Search
CPC ....................................................... G06F 8/35
See application file for complete search history.

(56) References Cited

U.S. PATENT DOCUMENTS

| 11,099,819 B1* | 8/2021 | Fontecilla ................. G06F 8/35 |
| 11,893,364 B2* | 2/2024 | Gilpin ....................... G06F 8/35 |
| 2018/0081668 A1* | 3/2018 | Eberlein ................... G06F 8/70 |
| 2022/0398077 A1* | 12/2022 | Stopford ................... G06F 8/76 |

\* cited by examiner

*Primary Examiner* — Qamrun Nahar
(74) *Attorney, Agent, or Firm* — Buckley, Maschoff & Talwalkar LLC

(57) ABSTRACT

Briefly, embodiments of a system, method, and article for receiving a user input requesting that an initial application container compatible with a first programming model be modified to generate an adjusted application container compatible with a second programming model. The second programming model is different from the first programming model. A first set of development artifacts may be determined for the initial application container. A first subset of the first set of development artifacts may be automatically adjusted to enable compatibility with the second programming model. automatically generate One or more behavior definitions associated with the automatically adjusted first subset may be automatically generated. The adjusted application container comprising the initial application container and the one or more behavior definitions may be generated.

20 Claims, 17 Drawing Sheets

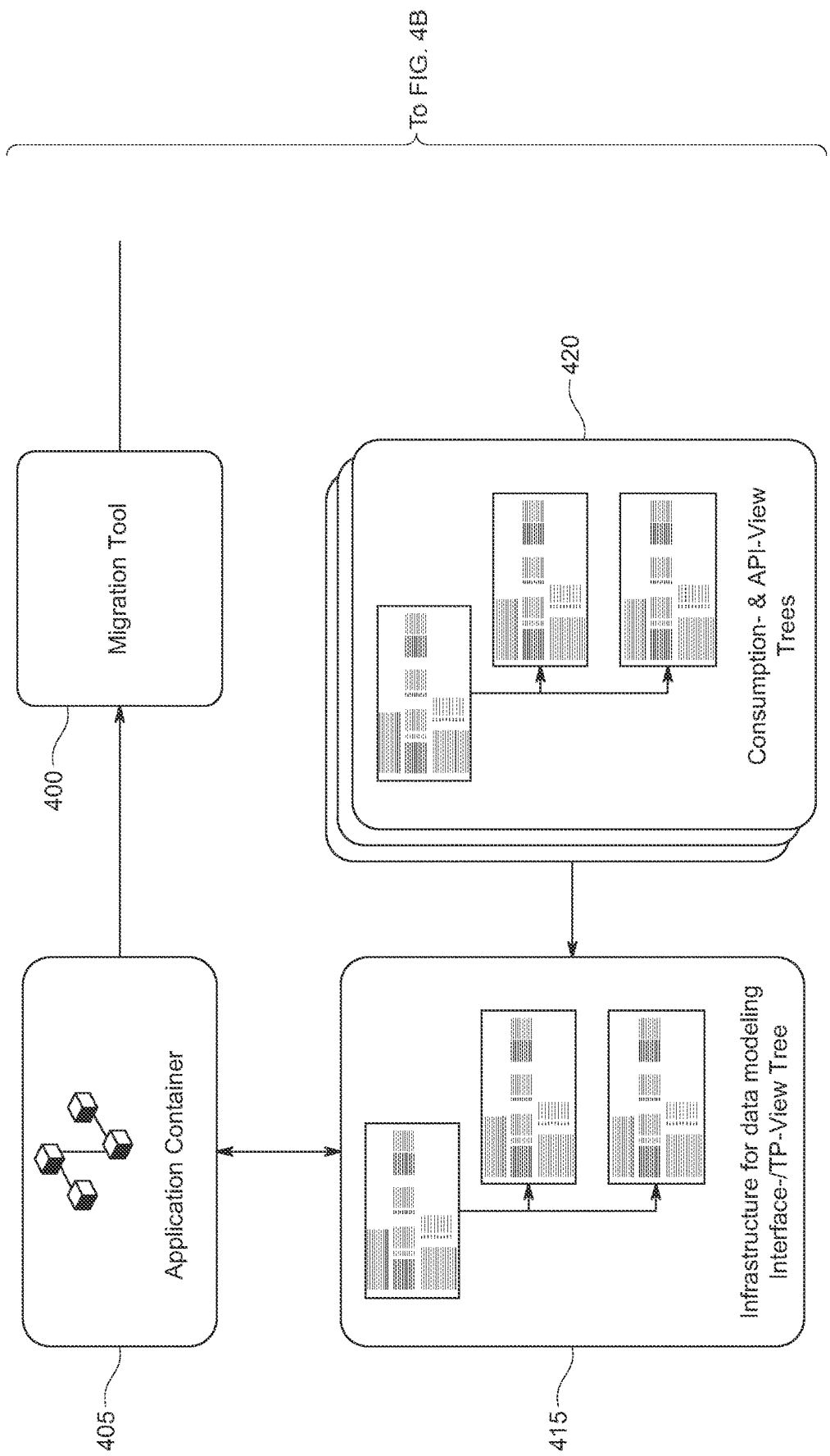

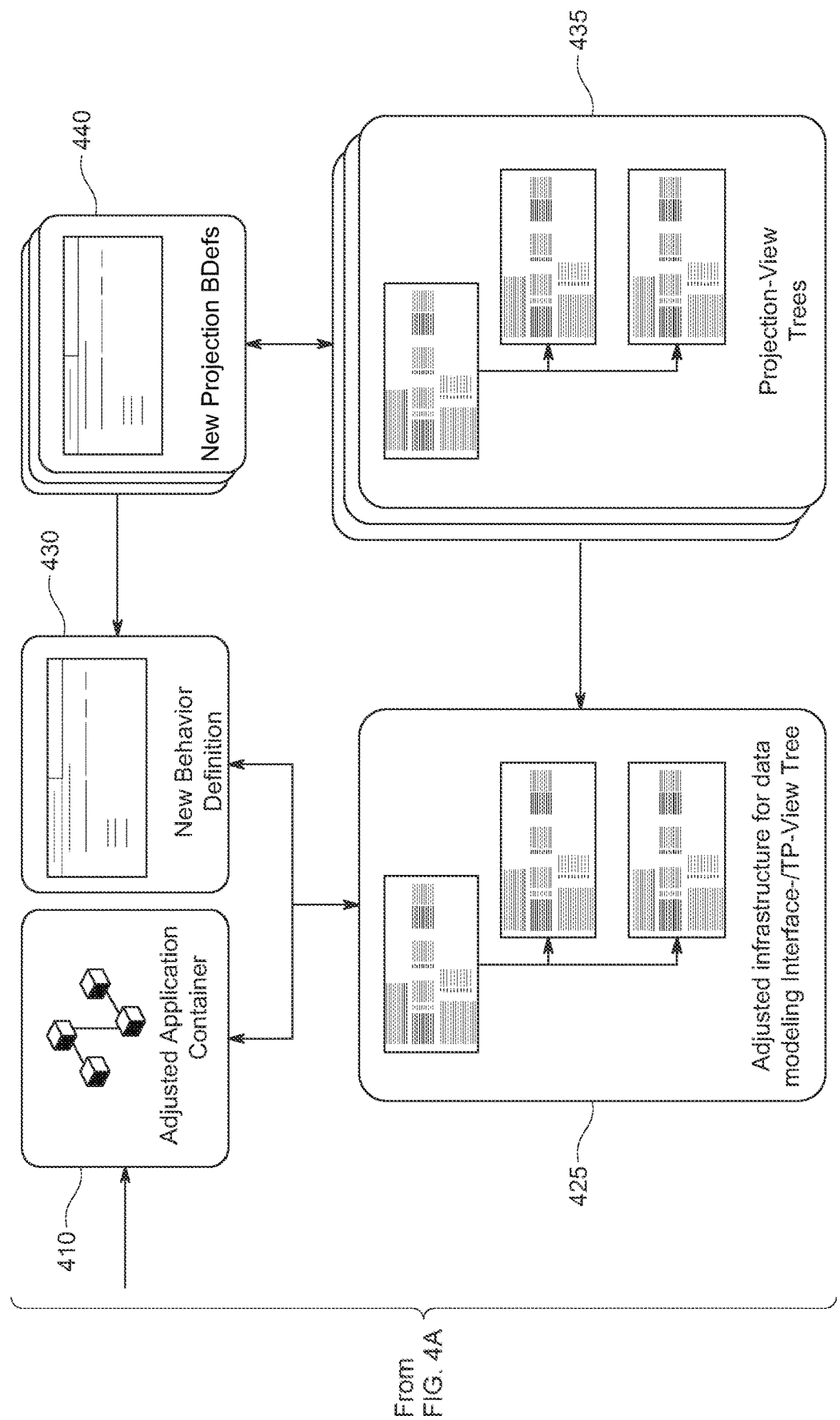

FIG. 5C

| Sequence/Message | | Name |
|---|---|---|
| ∨ ▸ Application Container — 610 | | |
| ∧ ⓘ Initialization — 615 | | |
| ∨ ▸ Tree ZMIG_R_TRAVEL_000 — 618 | | |
| ∧ ⚠ Pre-check of Application Container — 620 | | |
| ∧ ⓘ Loading the Application Container — 625 | | |
| ∨ ⊗ Pre-check — 630 | | |
| ⓘ Check finished. — 627 | | ZMIG_R_TRAVEL_000 |
| ⚠ Virtual data model ZMIG_R_BOOKING_000 is not yet a V2 View Entity — 635 | | ZMIG_R_BOOKING_000 |
| ⓘ Pre Check for CDS View Hierarchy finished — 640 | | ZMIG_R_TRAVEL_000 |
| ⓘ Precheck finished for BDEF Generation of ZMIG_R_TRAVEL_000 — 645 | | ZMIG_R_TRAVEL_000 |
| ∧ ⓘ Adjusting and generating the Source Code | | |
| ∨ ▸ Tree ZMIG_C_TRAVEL_000 — 655 | | |
| ∧ ⓘ Pre-check — 660 | | |
| ∧ ⓘ Adjusting and generating the Source Code — 665 | | |
| ∧ ⓘ After-check — 670 | | |

FIG. 6A

| Console | |
|---|---|
| Type | |
| BOBF (object) | |
| DDLS (Data Definition) | |
| STOB (Entity) | |
| BDEF (Behavior Definition) | |

675 — Virtual Data Model ZMIG_R_BOOKING_000 is not yet a virtual data model V2 Entity.

Diagnosis

Your virtual data model ZMIG_R_BOOKING_000 has been checked and identified as a virtual data model which is not of type V2 entity. As a prerequisite for Migration, all Views of the transactional processing layer should be defined as view entities.

Procedure

Please switch your TP virtual data model definition into a virtual data model Entity.

Do not insert the root statement into the adjusted views. Do not remove BOPF Related/ @ObjectModel Annotations.

Switching to virtual data model Entities is only mandatory for a TP-layer virtual data model, but is not required for a C-Layer virtual data model.

A tool-based switch of virtual data model (V1) to virtual data model (V2) is available. For this approach, go to the Project Explorer, open the context menu of a virtual data model (V1) and choose "Migrate to virtual data model entity..."

From FIG. 6A

| [D] [XT7] ZMIG_R_TRAVEL_000 | ⊕ [XT7] ZMIG_R_TRAVEL_000 |

Data Definition Compare §

```
 1  @AccessControl.authorizationCheck: #NOT_REQUIRED
 2  @Metadata.allowExtensions: true
 3  @EndUserText.label: 'Root Base View'
 4  @Search.searchable: true
 5
 6
 7  @ObjectModel: {
 8  transactionalProcessingEnabled: true,
 9  compositionRoot: true,
10
11      createEnabled: true,
12      updateEnabled: true,
13      deleteEnabled: true,
14
15      draftEnabled: true,
16      writeActivePersistence: 'zmig_a_trvl_000',
17      writeDraftPersistence: zmig_d_trvl_000',
18      entityChangeStateId: 'last_changed_at_total',
19
20      semanticKey: ['travel_id']
21  }
22
23  define view entity ZMIG_R_TRAVEL_000
24      as select from zmig_a_trvl_000 as Travel
25
26      association [0..*] to ZMIG_R_BOOKING_000 as _Booking on
27
28      association [0..1] to /DMO/I_Agency    as _Agency on $projection.
29      association [0..1] to /DMO/I_Customer  as _Customer on $projection.
30      association [0..1] to I_Currency       as _Currency on $projection.
31
32  {
33          @ObjectModel.readonly: true
34      key Travel.mykey,
```

```
[XT7] ZMIG_SB_TRAVEL_000_V4    Compare  X        705  715

1 @AccessControl.authorizationCheck:
2 @Metadata.allowExtensions: true
3 @EndUserText.label: 'Root Base
4 @Search.searchable: true
5
6
7 @ObjectModel: {
8 transactionalProcessingEnabled:
9
10
11
12
13
14
15
16
17
18
19
20 semanticKey: ['travel_id']
21 }
22
23 define root view entity ZMIG_R
24 as select from zmig_a_trvl_000 as
25
26 composition [0..*] of ZMIG_R
27
28 association [0..1] to /DMO/I_
29 association [0..1] to /DMO/I_
30 association [0..1] to I_Currency
31
32 {
33
34 key Travel.mykey,
``` agency_id    = _Agency.Agencyl
customer_id  = _Customer.Custo
currency_code = _Currency.Curre From FIG. 7A To FIG. 7C

FIG. 7B

PROGRAMMING MODEL MIGRATION TOOL

BACKGROUND

A programming model may be used by programmers or users to design applications. Programming models are often updated or replaced over time to add new features and/or to remove existing features. A programming model may be utilized to generate and/or otherwise use various application containers. An application container, or business object, may comprise a container for application data, such as a customer or an invoice. An application container may comprise an entity within a multi-tiered software application which works in conjunction with data access and various logic layers to transport data. For example, data may be exchanged between components by application containers. The underlying structure of an application container may comprise an Extensible Markup Language (XML) schema definition (XSD).

If an application container has been created with a particular programming model and the programming model is subsequently replaced with a newer or otherwise different programming model, the application container may be moved or transitioned from the old programming model to the newer programming model, such as in order to continue being used by an application designed in accordance with the newer programming model. However, if there are incompatibilities and/or differences between the two programming models, aspects or characteristics of the application container may be changed or updated in order to transition the application container to be used by an application designed in accordance with the newer programming model.

One way to perform the transition or migration of the application container from an old programming model to a newer programming model may entail a human programmer manually editing code relating to an application container to update characteristics to be compatible or otherwise usable by an application designed via the newer programming model. However, having to manually update such application containers may be time-consuming and may be prone to the introduction of errors, particularly if a programmer makes a relatively large number of manual edits.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 4A-4B illustrate a migration tool for migrating, adjusting, or transforming an application container associated with a first, or predecessor, programming model over to an adjusted application container associated with a second, or successor, programming model according to an embodiment.

FIGS. 5A-5C illustrate screenshots of a context menu of a development tool which may be used to initiate migration of an application container from a predecessor programming model to a successor programming model according to an embodiment.

FIGS. 6A-6B illustrate a screenshot of a migration log according to an embodiment.

FIGS. 7A-7C illustrate a screenshot of a comparison view window according to an embodiment.

Figure 1:
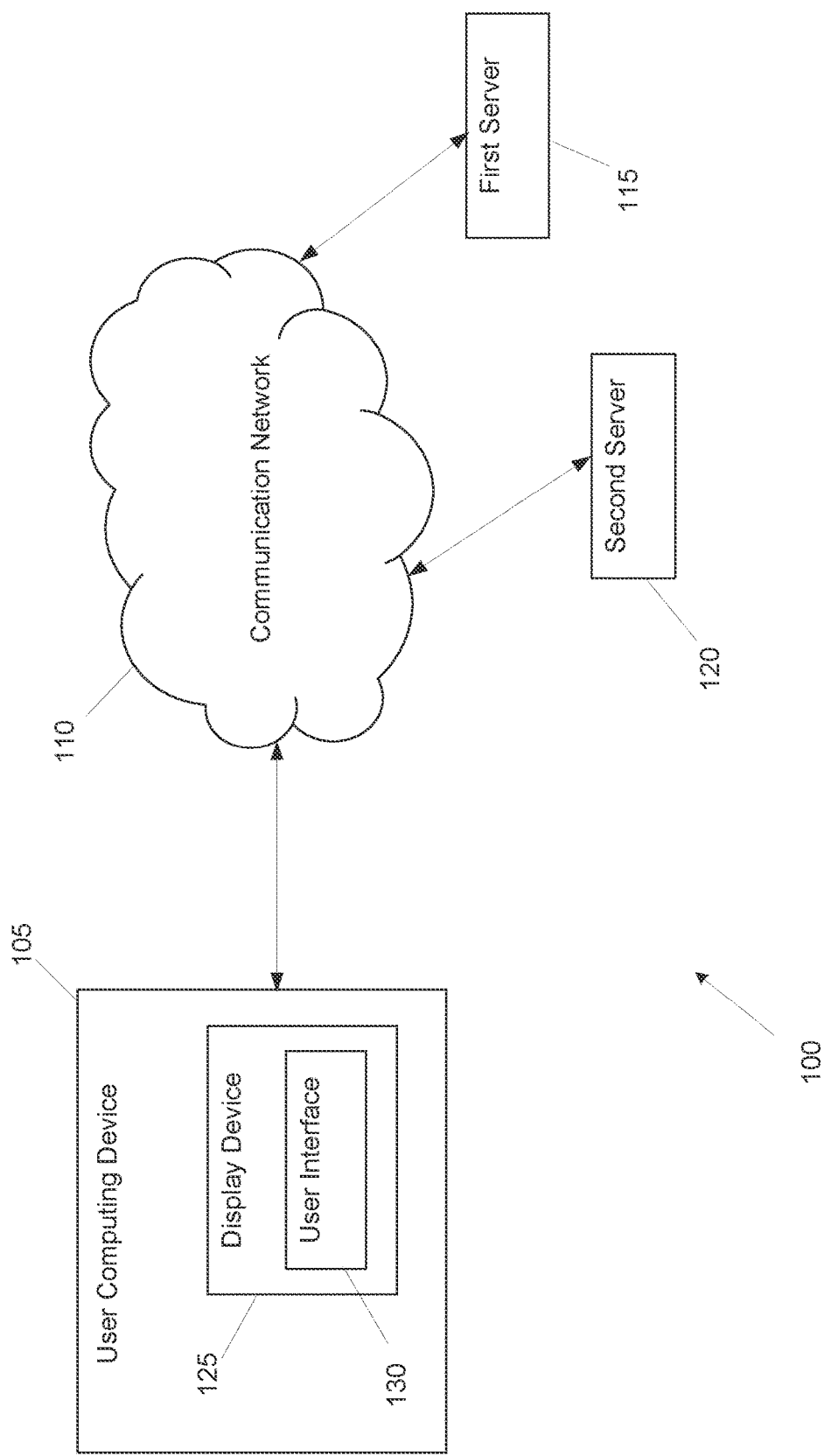
FIG. 1 illustrates an embodiment of a system which may be utilized to migrate or transition an application container usable within a first programming model, such as a predecessor programming model, over to a second or successor programming model.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art will readily understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded a scope consistent with the principles and features disclosed herein.

There are many different programming models used to design application programs which utilize application containers. An "application container" or "business object," as used herein, refers to a container for application data, such as an entity within a multi-tiered software application that works in conjunction with data access, data interaction, and logic layers to transport data. For example, data may be exchanged between components by application containers. A real object, such as an employee or a sales order, may be represented as an application container.

A programming model may be based on a particular programming language. One example of a programming language is Advanced Business Application Programming ("ABAP™") ABAP™ comprises a programming language supported on the SAP NetWeaver ABAP™ application server platform and applications that run on it, such as SAP ERP™ (formerly R/3), S/4HANA™ and Customer Relationship Management (CRM™). A programmer or user may use a programming language to modify the functionality of various applications or application containers and/or build their own applications or application containers on a programming platform, for example.

An application may include and/or utilize one or more application containers. A design language or system may enable programmers or users to create applications with a consumer-grade user experience, turning casual users into relative experts with simple screens which may run on a variety of devices. A design language may include guidelines and tools to enable a programmer or user to build and customize applications and applications data containers which are consistent with enterprise software solutions.

There are different programming models which may be utilized to generate applications for use with a particular design system. For example, different programming models may be utilized to build applications for a particular design system, and which are based on a particular programming language. Examples of programming models include Advanced Business Application Programming Model for SAP Fiori™ and Advanced Business Application Programming RESTful Application Programming Model™ (RAP).

A programming model may offer a standardized way to efficiently develop modern enterprise solution-optimized web-based applications of various types, e.g., search, analytical and transactional applications.

ABAP RAP™ comprises a newer and more modern approach for building applications and application containers. ABAP RAP™ includes various features and characteristics which are either not provided by ABAP Programming Model for SAP Fiori™ or are otherwise different from those of ABAP Programming Model for SAP Fiori™. A customer may have various previously created and/or designed application containers in ABAP Programming Model for SAP Fiori™ which the programmer desires to transition over to ABAP RAP™. In other words, a programmer may desire to use an application container which was created on and/or is operable on ABAP Programming Model for SAP Fiori™ on the newer ABAP RAP™. However, in order to make such an application container usable on ABAP RAP™, some characteristics, properties, and/or functionalities of the application container may be modified and/or adjusted to ensure compatibility with ABAP RAP™ There are different ways to modify characteristics and/or properties of an application container to ensure usability on ABAP RAP™. One way, for example, is for a human programmer to manually modify various characteristics and/or properties of the application container previously generated for use with ABAP Programming Model for SAP Fiori™ to ensure usability on ABAP RAP™. However, such a process may be relatively time-consuming, particularly for relatively large application containers or if a customer has a relatively large number of application programming containers to transition or migrate from ABAP Programming Model for SAP Fiori™ to ABAP RAP™. Moreover, such a process may be adversely impacted by the potential for human error, such as if a huma programmer incorrectly adjusts a particular characteristic or property of an application container.

An embodiment, as discussed herein, may provide a tool to migrate or transition an application container for a particular design system, such as SAP Fiori™, from a predecessor application programming platform, such as ABAP Programming Model for SAP Fiori™ or another ABAP-compatible programming platform, over to a ABAP-compatible successor application programming platform, such as ABAP RAP™.

In accordance with an embodiment, for both the predecessor and successor programming models, an application container may comprise various development artifacts. An "artifact" or "development artifact," as used herein, refers to a tangible by-product produced during the development of an application container or other types of software. Some artifacts (e.g., use cases, class diagrams, and other Unified Modeling Language (UML) models, requirements and design documents) may help describe the function, architecture, and design of an application container. Other artifacts are concerned with the process of development itself—such as project plans, business cases, and risk assessments, for example. An artifact may comprise a design-time object and may correspond to a table definition (e.g., generic for any database), a calculation view (e.g., specific to a programming model), or a role (e.g., security), to name just a few examples among many.

FIG. 1 illustrates an embodiment of a system 100 which may be utilized to migrate an application container usable within a first programming model, such as a predecessor programming model, over to a second or successor programming model. In some embodiments, one or both of the first and second programming models may comprise different versions of the same programming model or different programming models. For example, the first programming model may comprise an ABAP™ predecessor programming model, such as SAP Programming Model for SAP Fiori™, and the second programming model may comprise ABAP RAP™. System 100 may include a user computing device 105, a communication network 110, a first server 115, and a second server 120. Communication network 110 may comprise a local area network (LAN) or a wide area network (WAN), such as the Internet. Although a first server 115 and a second server 120 are shown in FIG. 1, in some embodiments, more or fewer than two servers may be in communication with user computing device 105 via communication network 110. In some embodiments, first server 115 and second server 120 may comprise a portion of a cloud infrastructure which includes additional components of data centers such as servers, persistent storage, and networking gear including routers and switches.

User computing device 105 may include a display device 125 and a user interface 130 rendered on the display device 125. A user or programmer may utilize user interface 130 to access a migration tool. For example, such a migration tool may comprise an application or a portion of an application to enable a user to select a particular application container to transition from the first programming model to the second programming model. For example, a user may utilize a migration tool to modify various characteristics, artifacts, or syntax for an application container associated with the first programming model so that the application container, after modification, may be usable within and/or compatible with the second programming model, as discussed in more detail below. "Syntax," as used herein, refers to rules that define combinations of symbols that are considered to be correctly structured statements or expressions. The syntax for an application container may comprise various characteristics or properties. The syntax for an application container compatible with a predecessor programming model differs from the syntax for an application container compatible with a successor programming model in some respects. A development artifact may be written in a particular language, such as Data Definition Language (DDL) or Behavior Definition Language (BDL), each of which is associated with a specific syntax. Artifacts may be written in statements corresponding to their associated syntax.

Figure 2:
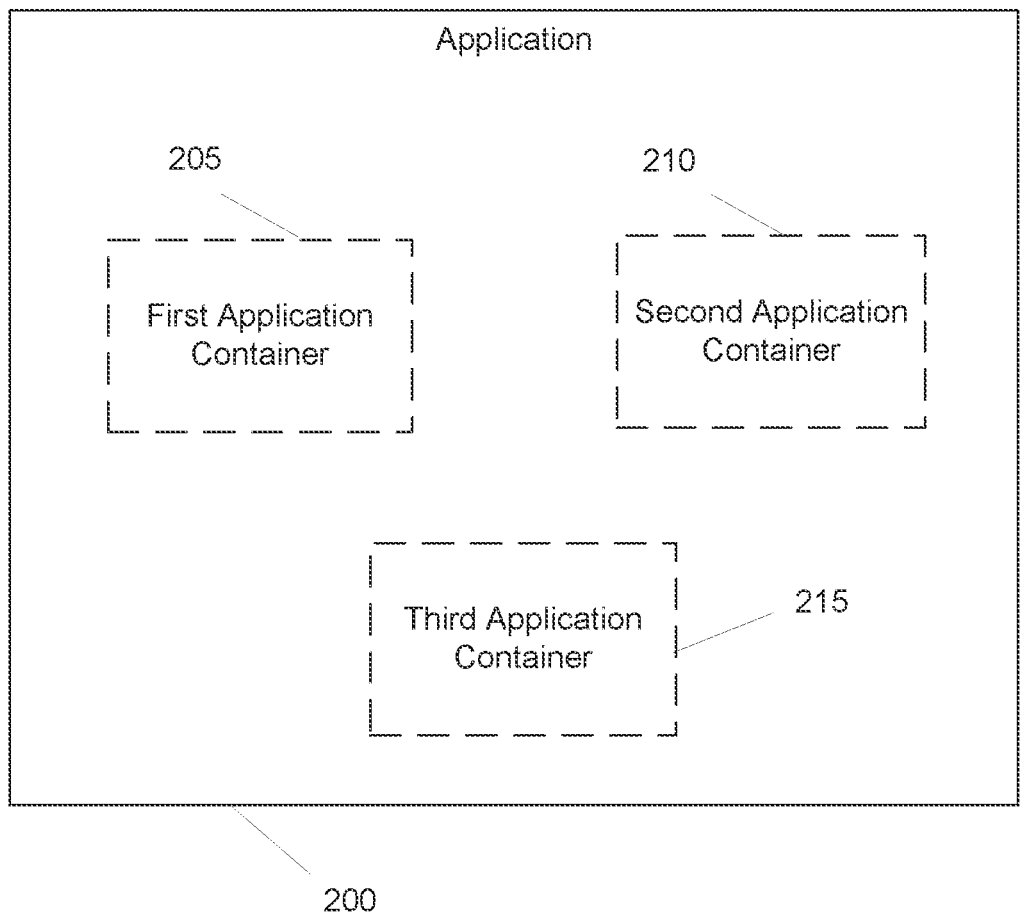
FIG. 2 illustrates a view of an application according to an embodiment.

FIG. 2 illustrates a view of an application 200 according to an embodiment. Application 200 may include one or more application containers. In this example, application 200 may include a first application container 205, a second application container 210, and a third application container 215. Although application 200 is illustrated as having three application containers in FIG. 2, in some embodiments, an application 200 may have more or fewer than three application containers.

Figure 3:
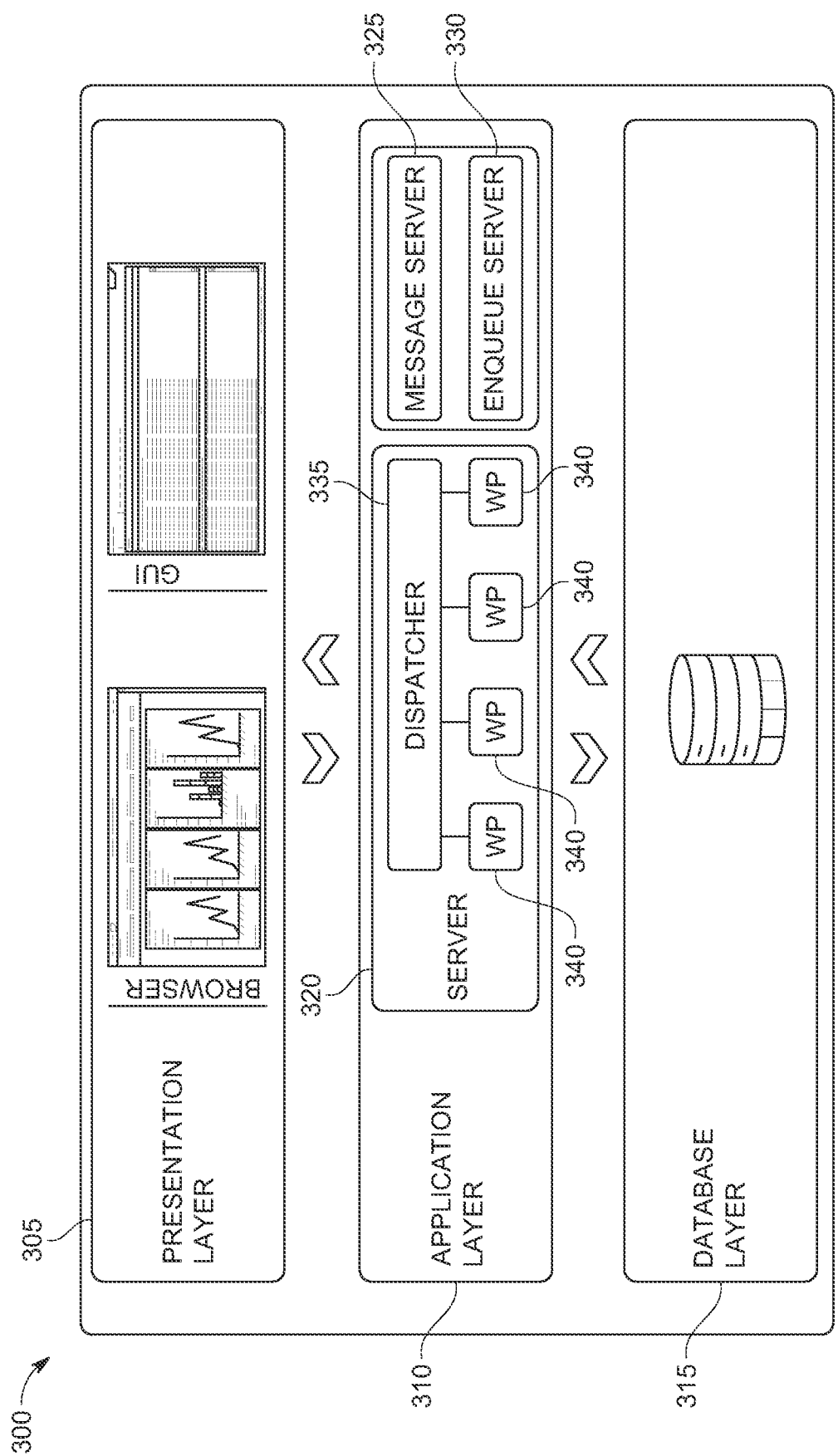
FIG. 3 illustrates an architecture of an application server according to an embodiment.

FIG. 3 illustrates an architecture 300 of an application server according to an embodiment. Architecture 300 includes three layers: a Presentation Layer 305, an Application Layer 310, and a Database Layer 315. The division of layers may be purely logical. These three layers may be run on a single computer, for example.

Database Layer 315 may contain user data and the program code of an application server and application programs, administrative data, among others, for example. Applications developed by a programmer may be stored in the schema of the system.

Application Layer 310 may comprise one or more application server instances 320, a single Message Server 325 responsible for communication and load distribution within this layer, and a single Enqueue Server 330, which may manage locks. Programs and development tools may run in the Application Layer 310. Dispatcher 335 may distribute requests to Work Processes (WP) 340 within an application server. A WP 340 may process an application program and may own a database connection so that the programmer does not have to take care of database handling (e.g., open/close database connections). A WP 340 may be assigned to a programmer for the time of program processing and afterwards may be free for another user. This architecture may be robust and scalable. Systems and external programs in accordance with the embodiment shown in FIG. 3 may communicate with one another through different protocols such as Remote Function Call (RFC), Transmission Control Protocol/Internet Protocol (TCP/IP), Hypertext Transfer Protocol (HTTP), and Open Data Protocol (OData).

Presentation Layer 305 may represent various user interfaces (UIs) and may be responsible for screen display. Presentation Layer 305 may receive user entries such as mouse-clicks and keyboard input, to name just two examples among many, and may pass the user entries on to Application Layer 310. Furthermore, Presentation Layer 305 may receive data from Application Layer 310 and may display the received data to the user.

An application container may include a data model and a transactional part or component. In both a predecessor programming model and a successor programming model, each of these data models may be defined using virtual data models, such as ABAP Core Data Service (CDS™) Views (CDS Views™). An infrastructure for data modeling may enable data models to be defined and consumed on the database server rather than the application server. This helps users leverage a database, and may enable fast, relatively real-time performance by performing many operations at database level (such as resource-consuming calculations, aggregations and string operations), enabling users to retrieve data quickly, cutting down on application execution time. An infrastructure for data modeling may be used to create an underlying data model that application services expose to UI clients as virtual data models.

Virtual data models of a database may allow direct access to underlying tables of the database. Virtual data models may push logic from an application server to a client-side and database. Virtual data models may include an ability to define views that access data from multiple tables, the use of annotations to provide additional information about the data model, and the ability to define associations between entities. Virtual data models may allow programmers to define views that access data from multiple tables, to make it easier for a user to create complex data models that incorporate data from different sources. Annotations are a feature of an example of virtual data models which allow programmers to add metadata to a data model. Annotations may provide additional information about the data, such as data types, field labels, and descriptions.

Virtual data models may additionally enable programmers to define relationships between entities in the data model, to make it easier to navigate and query the data in the system. Overall, virtual data models are a tool for businesses looking to optimize their database performance and streamline their development process.

Data for an application container and/or an application itself may be distributed across several database tables. Virtual data models may be used for modern application development on enterprise software systems. An infrastructure for data modeling provides enhancements in terms of data modelling and enable improved performance when combined with a database. Virtual data models allow programmers to create semantically rich data models which the application services expose to UI clients.

While data is still physically stored in transparent tables, virtual data models comprises an abstraction layer on top of the tables for data modelling purposes. Virtual data models understand the relationship between database tables and hide the complexity from a programmer. Using virtual data models, a customer may rearrange table fields according to application-specific desires from the source code of the customer's implementation.

Embodiments as discussed herein relate to the migration of various application containers from a predecessor programming model to a successor programming model. A successor programming model may comprise an evolutionary successor of a predecessor programming model. The successor programming model may enable the efficient and standardized development of web-based applications and Web APIs. The successor programming model may have three main layers: Data Modeling and Behavior, Service Provisioning, and Service Consumption. The Data Modeling and Behavior layer is where application container modeling and query definitions may occur. At the Data Modeling and Behavior layer, the transactional behavior may be defined and implemented. The Data Modeling and Behavior layer may also be referred to as a Transaction layer.

The Business Service Provisioning layer is where OData exposure of backend Data occurs in two operations. At a first operation, the protocol service scope definition is where the relevant data model entities are specified. As a second operation, the proper binding to the OData protocol may occur. The Service Consumption layer is where the scenario dependent consumption occurs.

The modeling of the transactional behavior differs between the programming models. In a predecessor programming model, a so-called "annotations" feature may be written into virtual data models to model parts of the application container transactional behavior, e.g., whether an entity is to be be updatable in a transactional context. These annotations lead to the generation of a so called application container, which is a container for transactional behavior. In this aspect, multiple options exist to define and implement the transactional behavior. Some of the concepts are actions, determinations, and validations. An "action," as used herein, refers to a defined interaction with an application container in an explicit manner. An action may be called directly by a user, such as via user interactions with a UI, on which a user may, for example, click or otherwise select buttons to execute an action.

A "determination," as used herein, refers to a piece of logic defined within an application container which is bound to one or more trigger conditions. A determination may be called in response to a particular triggering condition. For example, if a new sales order is created, a trigger condition <create> may be fulfilled as a result of the sales order being created. In this particular example, a determination called "Calculate ID" may be called in order to assign a new technical ID for such a newly created sales order instance.

A "validation," as used herein, refers to a process to ensure that incoming requests comply with predefined rules and constraints. A validation may be performed to check the consistency of an application container based on trigger conditions.

In the successor programming model, application containers may be implemented using similar concepts regarding data modeling and transactional behavior/exits. However, the behavior may be defined in a development object referred to as a Behavior Definition (BDEF). A "Behavior Definition" or "BDEF," as used herein, refers to definition which defines actions that can be performed on data, such as creating, updating, and deleting records. A BDEF may indicate actions which allow a consumer to execute determinations and validations on request. Determinations may be triggered as side effects which are triggered automatically when some fields are updated on the application. Validations may be performed to check the consistency of an instance of an application container based on trigger conditions. Validations may be automatically called or performed by the successor programming model if a particular trigger condition (e.g., Create, Update, or Delete) matches.

The syntax used to define the data model in virtual data models may also be different. The syntax for an application container compatible with a predecessor programming model may differ from the syntax for an application container compatible with a successor programming model in some respects. Accordingly, in order to migrate or transition an application container from a predecessor programming model to a successor programming model, some elements or portions of the syntax for the application container may have to be adjusted, modified, or otherwise changed to be compatible with the successor programming model.

The above-described behavior and syntax are parts of a Data Modeling and Behavior Layer. Its functionality may be encapsulated using a Service Consumption layer to connect use case specific, partly non transactional data, to the one present in the application container. The Data Modeling and Behavior Layer may provide an additional abstraction layer. Multiple Service Consumption Layers may be stacked side-by-side on top of a transactional layer. In a predecessor programming model, this may be defined using virtual data models with annotations. In a successor programming model, on the other hand, the Behavior Definition is separated into virtual data models (e.g., a data model) and projection Behavior Definitions (e.g., a transactional model).

"Design time" refers to a time during which an application is designed. Design time refers to processes that take place during development. "Runtime" refers to processes that take place while the application is running. At runtime, adjusted development artifacts for an application container may be integrated via a runtime adapter. Accordingly, the transactional behavior does not have to be rebuilt in new business applications but is instead integrated into the successor programming model, as described below with respect to FIG. 9.

Entity Manipulation Language (EML) is a part of a programming language and may be used to interact with application containers and their associated data. OData is an ISO/IEC approved, OASIS standard that defines a set of practices for building and consuming RESTful APIs. OData helps a programmer to focus on business logic while building RESTful APIs without having to worry about the various approaches to define request and response headers, status codes, HTTP methods, URL conventions, media types, payload formats, query options, etc. OData also provides guidance for tracking changes, defining functions/actions for reusable procedures, and sending asynchronous/batch requests.

FIGS. 4A-4B illustrate a migration tool 400 for migrating, adjusting, or transforming an application container associated with a first, or predecessor, programming model over to an adjusted application container associated with a second, or successor, programming model according to an embodiment. An application container 405 may have been generated for use with an application which is not native to the successor programming model and various aspects to the application container 405 may be adjusted or otherwise transformed to generate an adjusted application container 410 which may be used within the successor programming model.

Application container 405 may be associated with an infrastructure for data modeling 415. For example, virtual data models may be generated to view or display the infrastructure for data modeling on a UI. Infrastructure for data modeling 415 may comprise a tree structure which may be presented to a user via a UI. In one aspect, Transactional Processing (TP) Views of a transaction layer of the infrastructure for data modeling may be presented to a user via virtual data models.

The transaction layer associated with the application container 405 may be associated with a consumption layer. For example, Consumption and API-View Trees 420 may be presented to a user via a UI.

Artifacts may be represented in both the infrastructure for data modeling 415 and in the Consumption and API-View Trees 420. In order to migrate application container 405 to generate adjusted application container 410 usable with the successor programming model, various artifacts associated with application container 405 may be adjusted. Some of these adjustments may be automatically made by a migration tool and some may be made manually by a user. In one aspect, Behavior Definitions (BDEFs) may be generated which indicate adjustments to artifacts.

For example, an adjusted infrastructure for data modeling 425 may be associated with adjusted application container 410. For example, virtual data models may be generated to view or display the adjusted infrastructure for data modeling on a UI. Adjusted infrastructure for data modeling 425 may comprise a tree structure which may be presented to a user via a UI. In one aspect, a transaction layer of the infrastructure for data modeling may be presented to a user via virtual data models. Migration tool 400 may generate at least one new BDEF 430 which is associated with the adjusted infrastructure for data modeling 425. For example, a new BDEF 430 may be used to declare the features. A new BDEF 430 may be considered more of a definition than a restriction as there may not be a ground truth feature set against a restriction.

The transaction layer associated with the adjusted application container 410 may be associated with its own consumption layer. For example, Projection-View Trees 435 may be presented to a user via a UI. Projection-View Trees 435 may indicate adjustments to various artifacts at a consumption layer, such as via new projection BDEFs 440 to ensure compatibility with the successor programming model. For example, a new projection BDEF 440 may indicate artifacts such as restrictions or limitations on the use of various operations, such as Create, Delete, or Update with respect to one or more aspects of adjusted application container 410 to ensure that adjusted application container 410 is usable within the successor programming model.

The virtual data models of both transactional and consumption layers may be adjusted, and BDEFs may be derived and generated for the adjusted application container 410. The migration tool 400 assists programmers to migrate their predecessor programming language-based application containers to the successor programming language-based application containers by providing an integrated wizard to automate the changes and generation of the mentioned development objects.

Figure 5A:
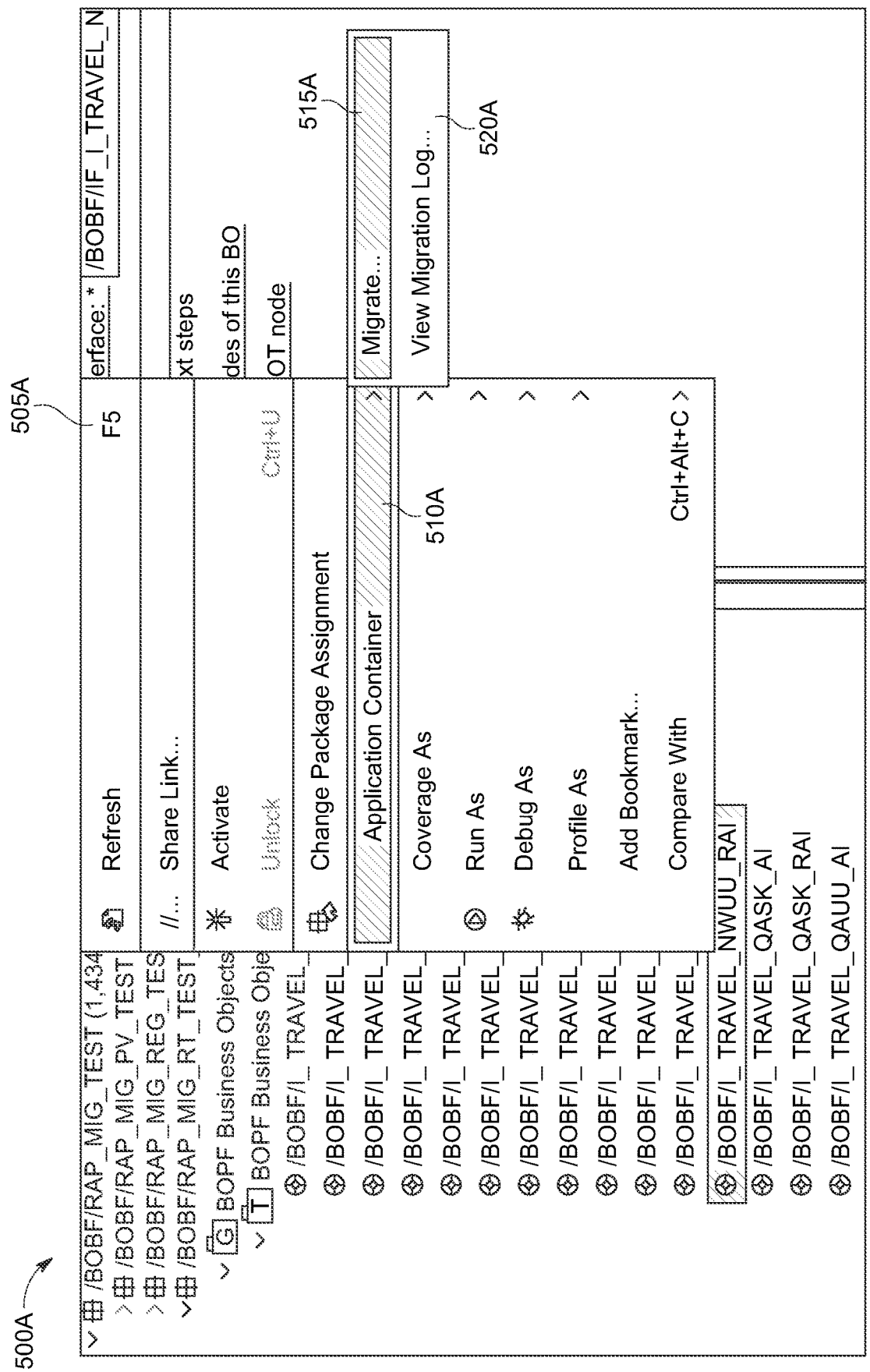
Figure 5B:
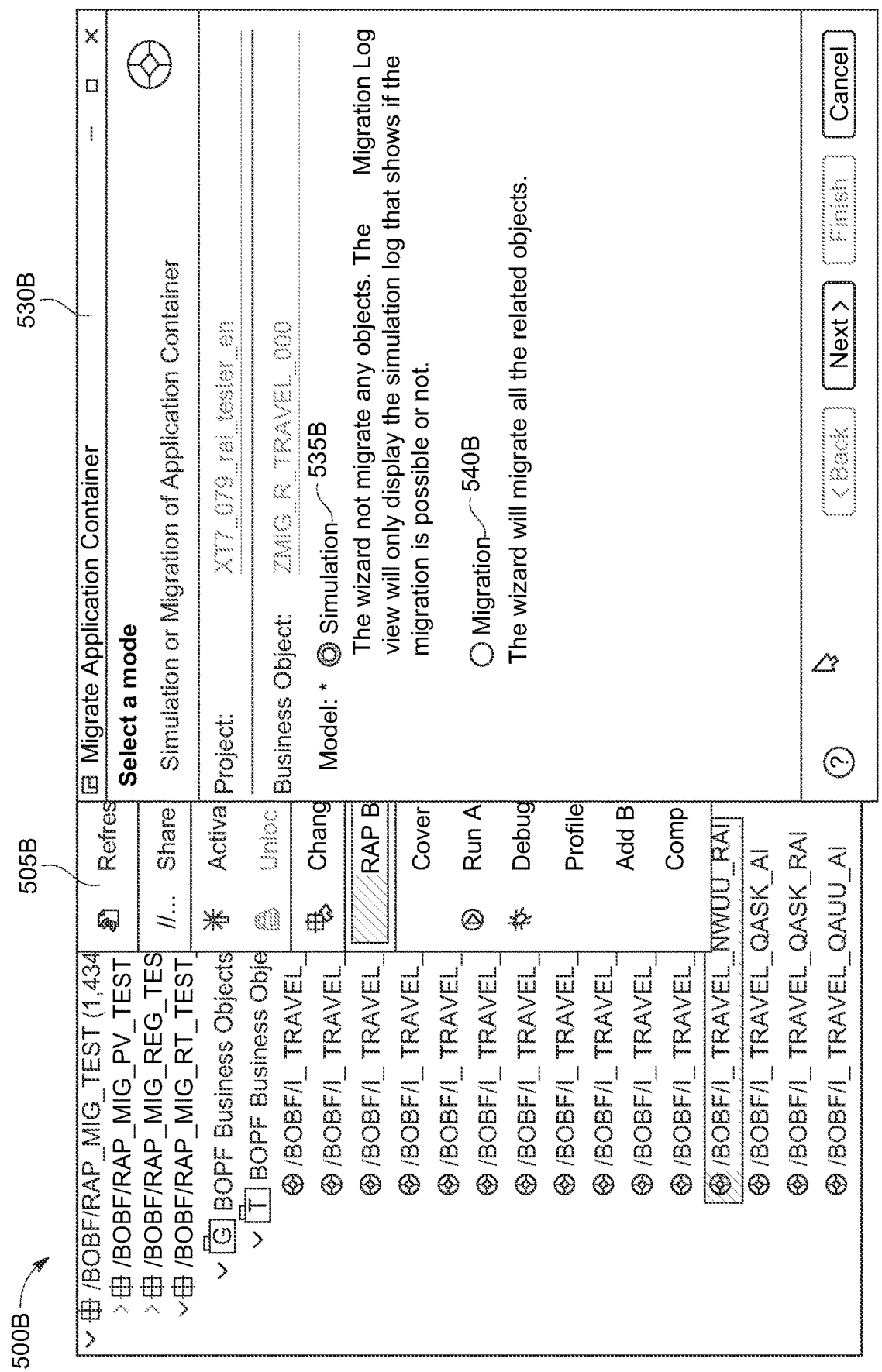
Figure 5C:
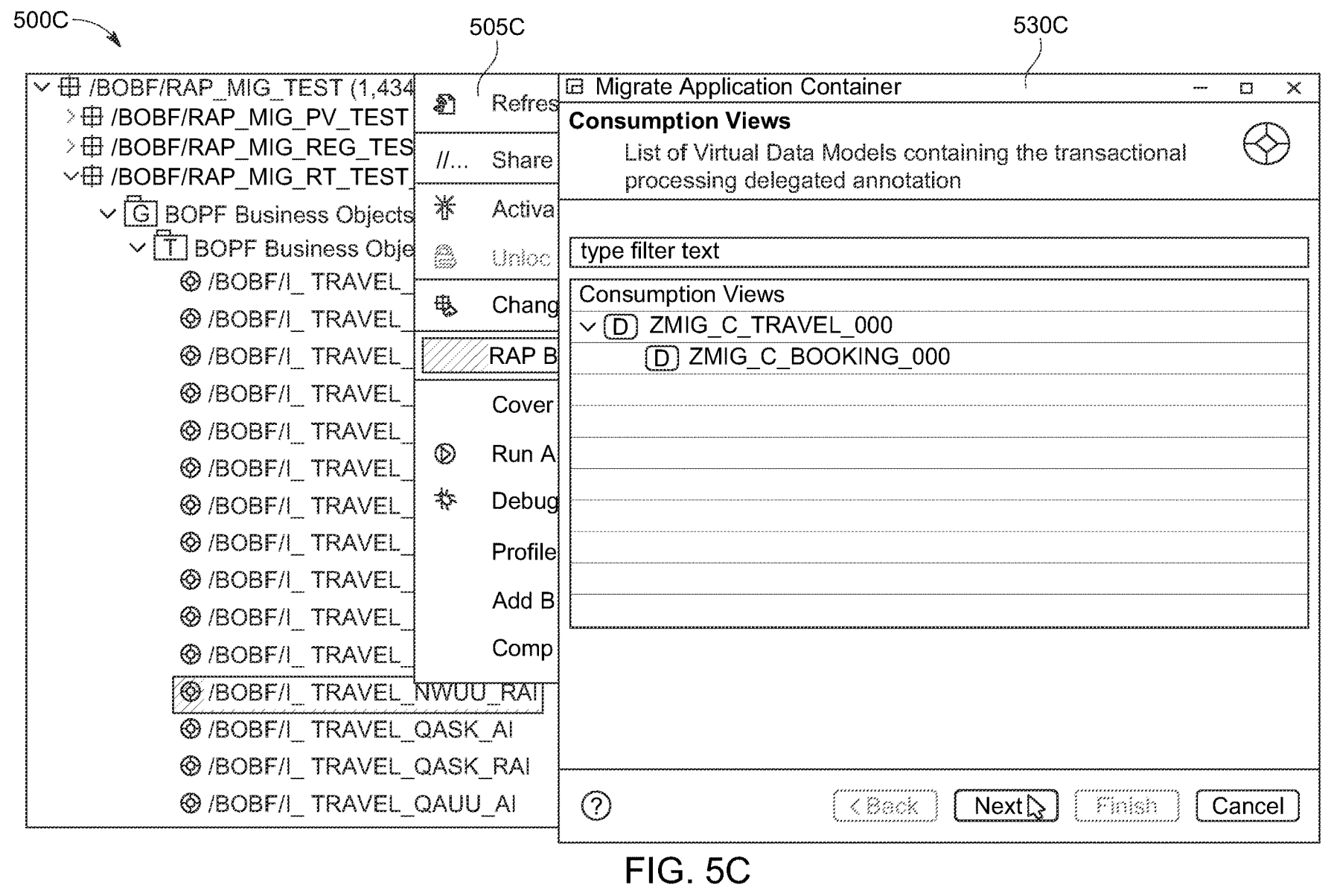

FIGS. 5A-5C illustrate screenshots of a context menu of a development tool which may be used to initiate migration of an application container from a predecessor programming model to a successor programming model according to an embodiment.

FIG. 5A illustrates a screenshot 500A of a context menu 505A of a development tool which may be used to initiate migration of an application container from a predecessor programming model to a successor programming model according to an embodiment. The development tool may display a root structure of an application container. A programmer may order structuring aspects for application containers. The programmer may also group various development artifacts and may select a type of development object. Application containers may be grouped within a selectable package, such as via a folder structure. An application container may have code contained within it, such as actions, determinations, validations. Some of the code of an application containers coded using a predecessor programming model may be reused with a predecessor programming model, for example.

A programmer may utilize context menu 505A to select an Application Container option 510A. If the user hovers a cursor over the Application Container option 510A, for example, sub-options may be displayed, such as a Migrate option 515A and a View Migration Log option 520A. A user may select Migration option 515A to initiate utilization of a migration tool to adjust various artifacts of the application container to be usable with the successor programming model. A user may also, or alternatively, select a View Migration Log option 520A to view a migration log, such as to view which adjustments are being made to the application container associated with the migration.

FIG. 5B illustrates a screenshot 500B of a context menu 505B of a development tool which may be displayed in response to a user selecting Migration option 515A of FIG. 5A. In FIG. 5B, Migrate Application Container window 530B may be displayed to indicate a Simulation Mode option 535B for a user to simulate a migration to the successor programming model. Migrate Application Container window 530B may also indicate a Migration Mode option 540B to perform the actual migration operation for the Application Container.

FIG. 5C illustrates a screenshot 500C of a context menu 505C of a development tool which may be displayed in response to a user selecting Migration Mode option 540B of FIG. 5B. In FIG. 5C, Migrate Application Container window 530C may be displayed to indicate various Consumption Views for the Application Container. For example, virtual data models may be displayed which contain a transactional processing delegated annotation.

In accordance with an embodiment, migration of an application container may be irreversible after the migration has been complete. In such an embodiment, a disclaimer or warning may be presented to a user if the user initiates a migration process. Tool-based adjustments may be embedded into a migration workflow which includes three steps: preprocessing; tool-based migration; and manual inspection and activation of changes.

A migration tool may provide a simulation mode. A simulation may perform checks on virtual data models and application containers associated with a predecessor programming model to determine possible incompatibilities and restrictions for which remodeling may be beneficial before migrating to the successor programming model. In a simulation mode, changes done to virtual data models may be simulated and a preview may be generated which simulates the generation of the BDEFs and provides a preview. Findings relating to a simulation may be reported in a simulation of a migration log, providing specific guidance dependent on an error context.

In a tool-based migration operation, a simulation may initially be executed. In case no findings are reported during the simulation, the changes to the development artifacts may be persisted to the system.

In a manual inspection and activation of changes operation, the migration log may provide guidance regarding possible manual postprocessing steps. Generated placeholders may mark adjustments for programmers such as, for example, new table names in case of an application using a draft functionality. The performed changes may be inspected and activated manually. A synchronization of the application container may be performed to fully migrating the application container from the predecessor programming model to the successor programming model.

FIGS. 6A-6B illustrate a screenshot 600 of a Migration Log 605 according to an embodiment. A user may access a Migration Log 605 by selecting a View Migration Log option 520A as shown above with respect to FIG. 5A. Migration Log 605 may be stored or persisted in a storage device of the system and may be accessed again using the migration tool to inspect reported messages and a preview or comparison of the development artifacts for an application container. A Migration Log 605 may be used like a worklist and may encourage an iterative migration approach to fix reported issues step by step using multiple simulation runs.

Migration Log 605 may show various artifacts for an application container being migrated to a successor programming model. Migration Log 605 comprises a results page for a migration. Migration Log 605 may be displayed for either a simulation of a migration of an application container or an actual migration of the application container from the predecessor programming model to the successor programming model. A migration process may be irreversible, so it may be beneficial for a user to perform a migration simulation and check the results in a Migration Log 605 before performing the actual migration to the successor programming model, for example.

Screenshot 600 illustrates a Migration Log 605 for a migration of an application container entitled "ZMIG_R-_TRAVEL_000" to the successor programming model. The Migration Log 605 may comprise two main columns: a Log/Tree View 607 and a Details Section 675 on the right hand side of the Migration Log 605. When opening a log from the Log/Tree View 607, the Details Section 675 may not yet be filled with any content. However, by selecting a specific message, the Details Section 675 may be refreshed with the corresponding content of this message.

Migration Log 605 may display a number of rows of a sequence/message relating to a migration of the application container in the Log/Tree View 607. At line 610 of the Migration Log 605, an item entitled "Application Container" may be displayed. Line 615 recites "Initialization" with a circle with a checkmark inside the circle, indicating that an initialization process relating to the migration of the application container has been performed successfully. There are two trees located within the application container entitled "ZMIG_R_TRAVEL_000". A first tree is located at line 618 and is entitled "Tree ZMIG_R_TRAVEL_000". A second tree is located at line 655 and is entitled "Tree ZMIG_C_TRAVEL_000".

In this example, ZMIG_R_TRAVEL_000 (_R_: Reuse) comprises the name of a root view of the transactional layer. As the application container may be generated from this artifact in this approach, as well the name of the artifact application container. In this case, this identifier may be used to identify or distinguish between the tree of the transactional layer and associated consumption layers.

The name ZMIG_C_TRAVEL_000 comprises the name of the root consumption view of the associated consumption layer of ZMIG_R_TRAVEL_000. Here, this name may also be used to address or group the artifacts in this consumption layer tree.

There are several items shown in Migration Log 605 which are associated with the first tree located at line 618. For example, a pre-check of the application container is shown on line 620. For example, a pre-check may be performed to ensure the technical consistency of the application container, e.g. to ensure that the application container is not in an inactive state (e.g., having unsaved modifications) in the system. There is also triangle with an exclamation point inside of it on line 620 indicating that there is a warning, such as caused by a potential issue relating to the pre-check of Tree ZMIG_R_TRAVEL_000. A user may click on or otherwise select any of the lines to see additional information relating to a migration operation. For example, the user may click or provide some other type of user input to select line 620, in which case the Details Section 675 may be displayed which indicates why the warning is associated with the pre-check operation and whether the user may want to consider modifying any information relating to the application container before the migration can be successfully completed.

On line 625, there is a statement that the application container has been successfully loaded, as indicated by the display of a circle with a checkmark inside of the circle on line 625. On line 627, a statement indicates that a pre-check has been successfully completed. There are several lines below line 627 which indicate operations relating to the pre-check. The pre-check corresponding to line 627 may include performing semantic or feature-specific tests. On line 630, a statement indicates that a check has been completed. On line 635, a statement indicates that a virtual data model, ZMIG_R_BOOKING_000 is not yet a virtual data model V2 Entity and therefore cannot be successfully migrated. There is also an "x" displayed on line 635 indicating that there was an error in performing this operation which prevents this operation from being completed. A user may double-click on or may otherwise provide a user input to select line 635 to open Details Section 675. Details Section 675 may indicate why an associated migration operation was unable to be successfully completed and what action(s) the user may undertake to ensure that the operation is able to successfully completed at a later time. If a user utilizes a migration tool to migrate an application container from a predecessor programming model to a successor programming model, but encounters errors during the migration process, the migration process ceases without migrating the application container.

In an embodiment shown in screenshot 600, Details Section 675 recites a diagnosis of why the error occurred and indicates a procedure which may be undertaken in order to avoid the error if the migration is subsequently attempted. In other words, Details Section 675 may provide context-specific guidance to resolve an error. Details Section 675 recites that an error associated with line 635 determined that a virtual data model ZMIG_R_BOOKING_000 has been checked and identified as a virtual data model which is not of type virtual data model V2 Entity. Details Section 675 also recites that as a prerequisite for migration to the successor programming model, virtual data models of the transactional processing layer may be defined as such view entities. Details Section 675 additionally recites how the user may overcome this error in the future by switching a TP virtual data model definition into a virtual data model Entity. Details Section 675 also recites that the user should not insert the root statement into the adjusted virtual data model and should not remove any BOPF-related @ObjectModel Annotations. Details Section 675 further recites that switching to virtual data model Entities is only mandatory for TP-Layer virtual data models and that it is not required for C-Layer virtual data models. Details Section 675 additionally recites that a tool-based switch of virtual data models (V1) to virtual data models Entities (V2) is available and that for this approach, the user is suggested to a Project Explorer, open the context menu of a virtual data model (V1) and choose "Migrate to virtual data model Entity . . . "

Referring back to Migration Log 605, line 640 recites that a pre-check for a virtual data model hierarchy is finished and that there is an associated error with this operation. As discussed above, a user may select line 640 in order to cause the Migration Log 605 to display an explanation window indicating why there is an error associated with the pre-check operation shown in line 640. Line 645 indicates that a successful pre-check has finished for BDEF Generation ZMIG_R_TRAVEL_000. Line 650 indicates that source code for the application container has been adjusted and generated.

Line 660 indicates that a successful pre-check has been performed for Tree ZMIG_C_TRAVEL_000. Line 665 indicates that source code has been successfully adjusted and generated. Line 670 indicates that an after-check has been successfully completed for Tree ZMIG_C_TRAVEL_000.

Figure 7C:
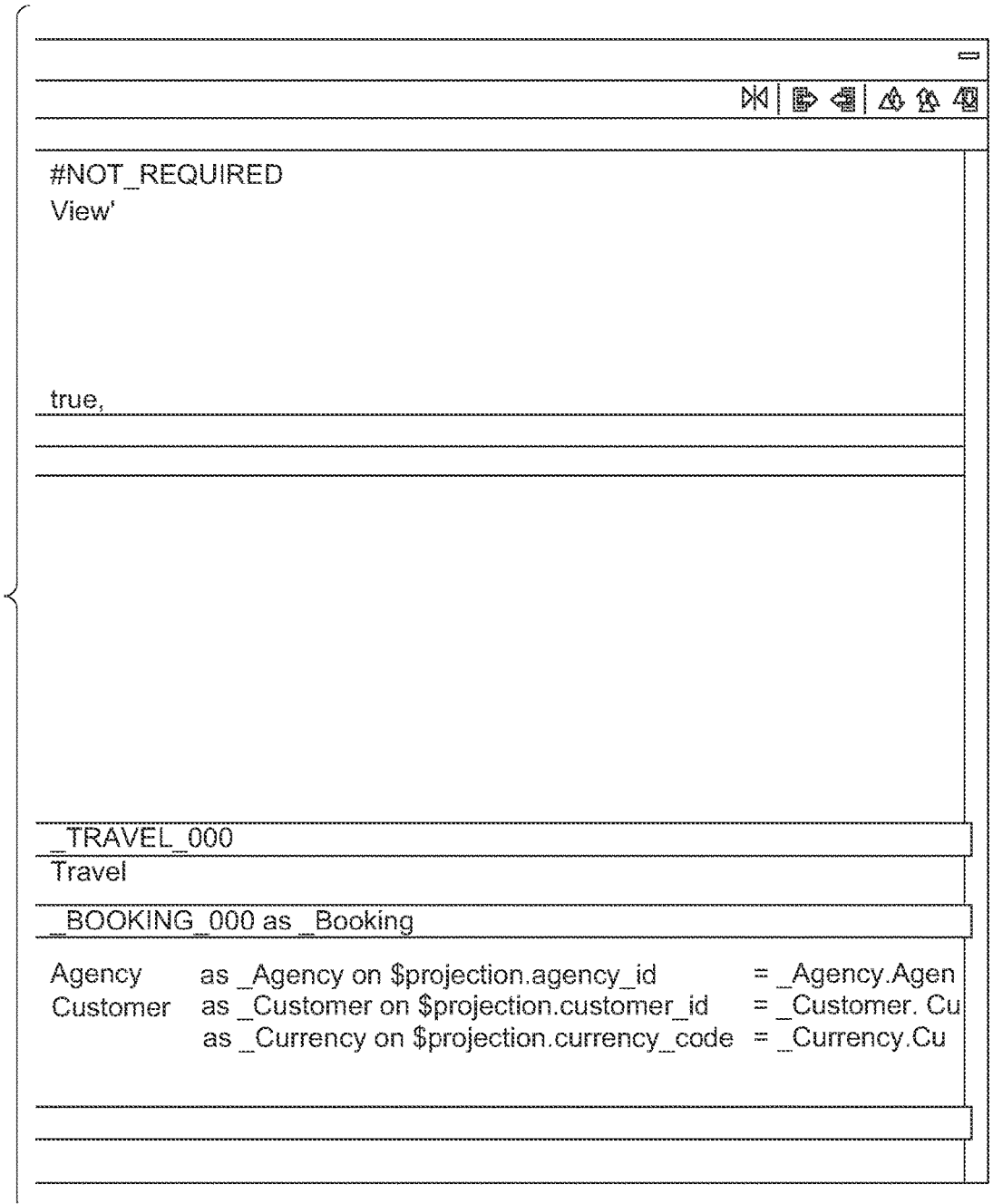

A user is enabled to simulate a migration of an application container to a successor programming model. The user may access a comparison view window to see how syntax differs between what the current application container has currently and how the syntax will be after the application container has migrated from a predecessor programming model to a successor programming model. FIGS. 7A-7C illustrate a screenshot of a comparison view window 705 according to an embodiment. Comparison view window 705 is segmented into two portions—a pre-migration view 710 shown on the left-hand side of screenshot 700 and a post-migration view 715 shown on the right-hand side of screenshot 700. The comparison view window 705 includes 34 lines, some of which are blank and some of which recite code or text, such as related to syntax for an application container. Some of the lines recite the same information for both the pre-migration view 710 and the post-migration view 715, such as the information on lines 1-4, 7-8, 20, 24, and 28-30. Lines which recite the same information for both the pre-migration view 710 and the post-migration view 715 may be displayed without shading, whereas lines which differ between the pre-migration view 710 and the post-migration view 715 may be displayed with a shading. For example, the information for lines 9, 11-13, 15-18, and 33 are shaded on pre-migration view 710 because the information on those lines is omitted from post-migration view 715. The comparison window identified on line 9 comprises the first difference between the two versions and may be marked by the tool by default. Lines 23 and 26 include information for both the pre-migration view 710 and the post-migration view 715, but these lines are shaded because the code or text recited on these lines differs between the views.

Figure 8:
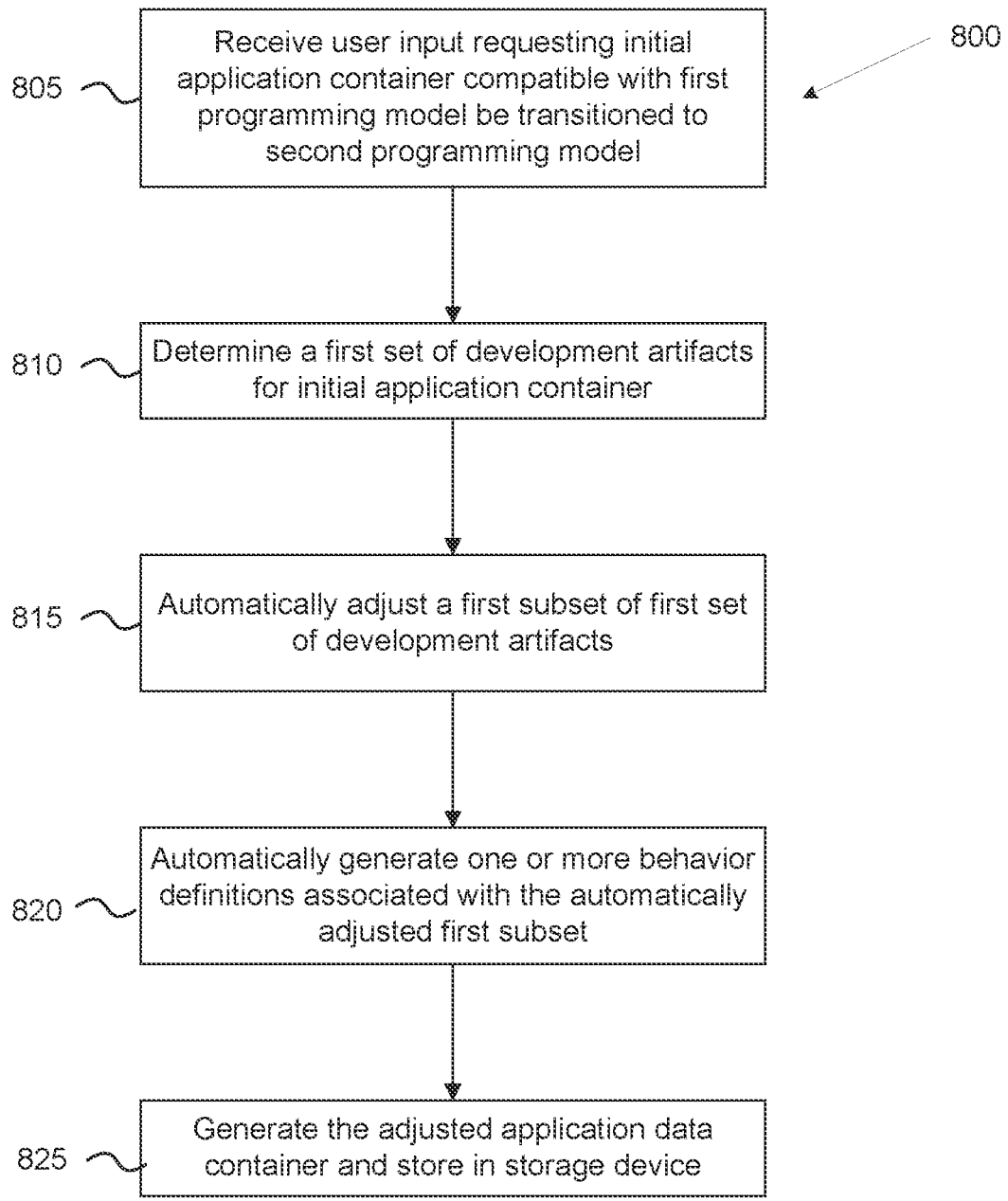
FIG. 8 illustrates an embodiment of a flowchart of a process for migrating an application container from a first programming model to a second programming model.

FIG. 8 illustrates an embodiment of a flowchart 800 of a process for migrating an application container from a first programming model to a second programming model. Embodiments in accordance with claimed subject matter may include one or more of operations 805 through 825. Also, the order of operations 805 through 825 is merely an example order. For example, a method in accordance with an embodiment may be performed by a computing device having one or more processors.

At operation 805, a user input may be received which requests that an initial application container compatible with a first programming model be modified to generate an adjusted application container compatible with a second programming model. The second programming model may be different from the first programming model. At operation 810, a first set of development artifacts for the initial application container may be determined.

At operation 815, a first subset of the first set of development artifacts may be automatically adjusted to ensure compatibility with the second programming model. At operation 820, one or more behavior definitions associated with the automatically adjusted first subset may be automatically generated. At operation 825, the adjusted application container comprising the initial application container and the one or more behavior definitions may be generated.

One or more additional operations associated with a method depicted in flowchart 800 may be performed in some embodiments. For example, at runtime, an adapter may integrate the adjusted development artifacts via an adapter. An option may also be presented to a user to perform a simulated migration to simulate generation of the revised application container. A selectable wizard to manage the automatic adjustment of the first subset of the first set of development artifacts.

A preprocessing operation may be performed in some embodiments to determine potential incompatibilities and restriction prior to automatically adjusting the first subset of the first set of development artifacts. The automatically adjusted first subset and the one or more behavior definitions associated with the automatically adjusted first subset may be persisted or stored in a storage or memory device. A migration log may be generated to indicate steps performed between accessing the initial application container and generating the revised application container. Such a migration log may be displayed on a user interface of a computing device.

The migration of an application container at design time are described above with respect to FIGS. 5A-8. For example, artifacts for application containers may be adjusted at design time. After the artifacts have been adjusted at design time, the adjusted artifacts for application containers may be integrated via a runtime adapter.

Figure 9:
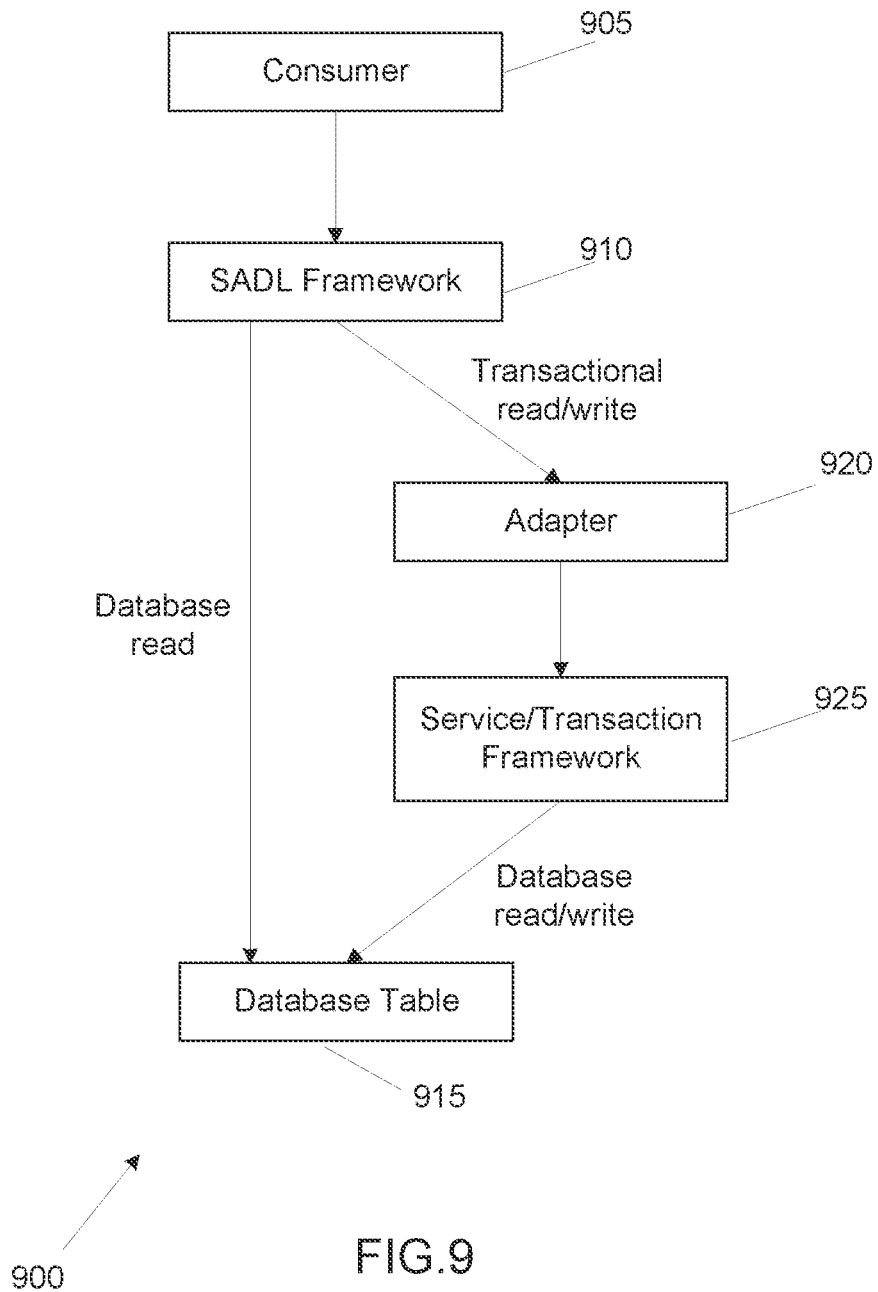
FIG. 9 illustrates a system for executing an application which is not native to a successor programming model in accordance with the successor programming model according to an embodiment.

FIG. 9 illustrates a system 900 for executing an application which is not native to a successor programming model in accordance with the successor programming model according to an embodiment. In system 900, artifacts for application containers which were generated in accordance with a predecessor programming model have been adjusted at design time. System 900 may be utilized to access a Database Table 915 at runtime.

A Consumer 905 may desire to access a Database Table 915. Consumer 905 may transmit a call, message, or request, such as an EML or OData call, to a Service Adaptation Description Language (SADL) Framework 910. An SADL Framework 910 running on an application server may enable fast read access to data for scenarios on mobile and desktop applications using a query push-down. SADL Framework 910 may enable the consumption of entity relationship-like data models in various scenarios with a common development experience based on a model-driven approach. If a call received from Consumer 905 requests a database read, the database read request may be performed by accessing Database Table 915. On the other hand, if a call received at SADL Framework 910 requests a transactional read/write, the request may be provided to an adapter 920. Adapter 920 may integrate adjusted development artifacts for various application containers utilized by the non-native application. After integrating the adjusted development artifacts for the application containers, the adapter 920 may interface with a Service/Transaction Framework 925 which may, in turn, access Database Table 915 to perform a database read/write operation.

In system 900, artifacts for application containers which were generated in accordance with a predecessor programming model have been adjusted at design time. System 900 may be utilized to access a database table at runtime.

Figure 10:
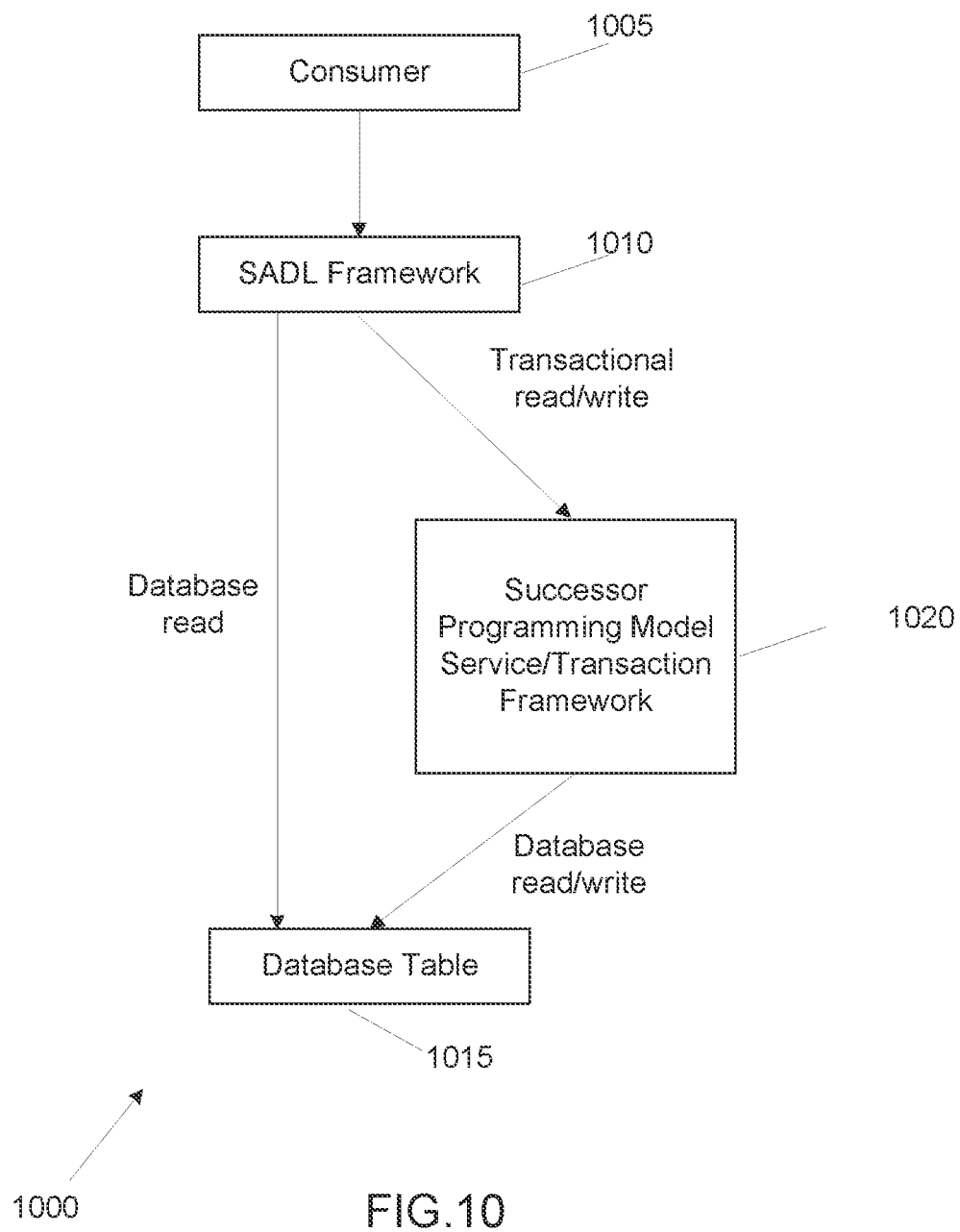
FIG. 10 illustrates a system for executing an application which is native to a successor programming model in accordance with the successor programming model framework according to an embodiment.

FIG. 10 illustrates a system 1000 for executing an application which is native to a successor programming model in accordance with the successor programming model framework according to an embodiment. System 1000 includes a Consumer 1005, an SADL Framework 1010, and a Database Table 1015 which are similar to the Consumer 905, SADL Framework 910, and Database Table 915 of system 900 shown in FIG. 9. However, because system 1000 is for processing an application which is native to the successor programming model, artifacts of application containers may not have to be adjusted to be used by the application. Accordingly, any requests for a transactional read/write may be performed by a Successor Programming Model Service/Transaction Framework 1020, instead of using a combination of an adapter 920 and a Service/Transaction Framework 925, such as is included in system 900 shown in FIG. 9.

The use of a migration tool to migration an application container from a predecessor programming model to a successor programming model automates repetitive and error prone tasks of adjusting virtual data models to a new syntax associated with the successor programming model. Migration logs may report or otherwise indicate possible adjustments for both, before and after migration and therefore provide a rough estimate for the complexity and effort to be exerted to modernize application containers to be usable with the successor programming model. The derivation of BDEF statements for a successor programming model from virtual data models and application containers from a predecessor programming model ensures a correct mapping between the concepts of both programming models.

Figure 11:
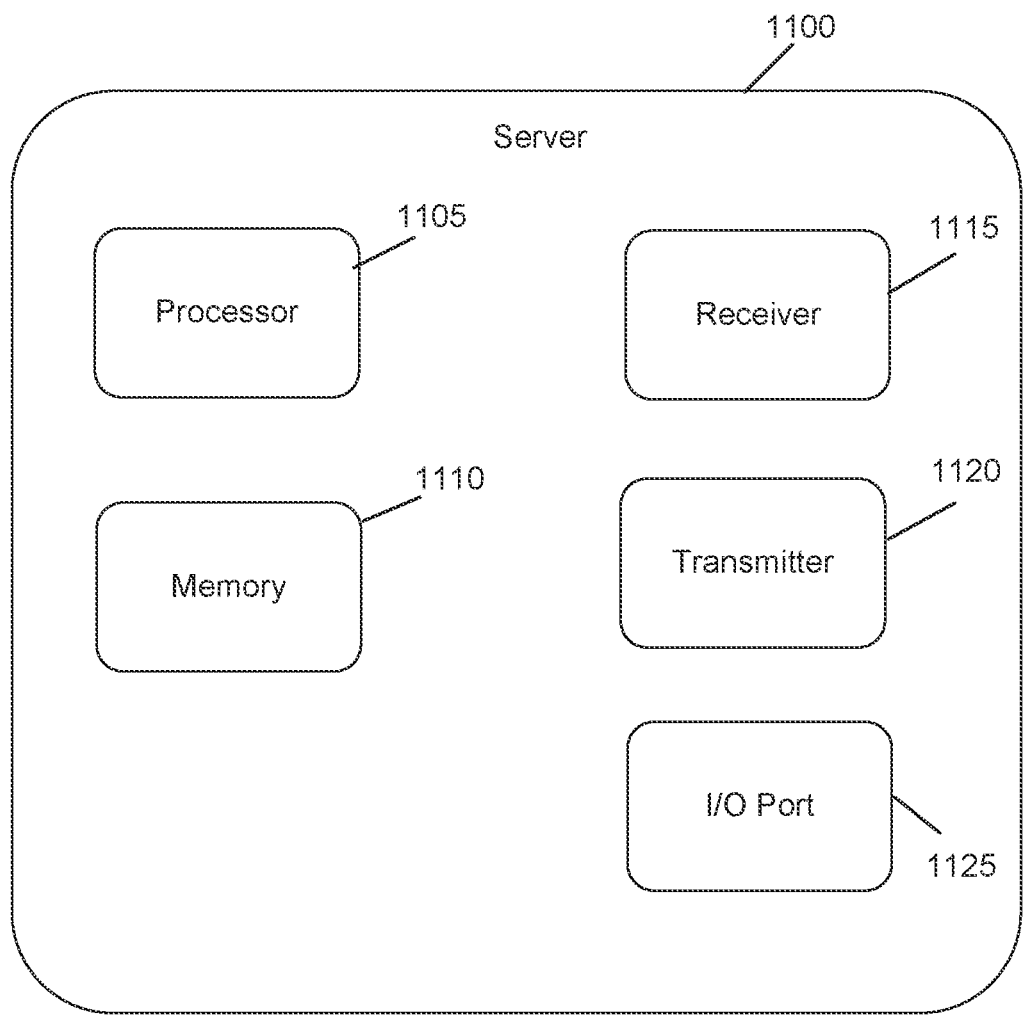
FIG. 11 illustrates a computing device according to an embodiment.

FIG. 11 illustrates a computing device 1100 according to an embodiment. Computing device 1100 may include a processor 1105. Processor 1105 may be utilized to execute an application, such as an application which utilized a migration tool to migration an application container compatible with a first programming model over to an adjusted application container compatible with a second programming model. Computing device 1100 may include additional components, such as a memory 1110 or other type of storage device, a receiver 1115, a transmitter 1120, and an Input/Output (I/O) port 1125. Processor 1105 may execute computer-executable code stored in memory 1110 which may be related to an application. For example, computing device 1100 may communicate via receiver 1115, transmitter 1120, and/or I/O port 1125.

Some portions of the detailed description are presented herein in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. In accordance with one or more embodiments, an article may comprise a non-transitory storage medium or a non-transitory machine-readable medium on which one or more machine-readable instructions are stored which are executable by a processor, such as a programmable processor, to perform one or more operations.

It has proven convenient at times, principally for reasons of common usage, to refer to such signals as bits, data, values, elements, symbols, characters, terms, numbers, numerals or the like. It should be understood, however, that these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

It should be understood that for ease of description, a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network, such as a communication network, may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as computing and/or communication protocols (e.g., network protocols), may interoperate within a larger network. In this context, the term sub-network and/or similar terms, if used, for example, with respect to a network, refers to the network and/or a part thereof. Sub-networks may also comprise links, such as physical links, connecting and/or coupling nodes, such as to be capable to transmit signal packets and/or frames between devices of particular nodes, including wired links, wireless links, or combinations thereof. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without re-routing and/or redirecting transmissions. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate nodes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but devices outside the private network may not necessarily be able to direct inbound network communications to devices included in the private network.

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include implementations falling within the scope of the appended claims, and equivalents thereof.

What is claimed is:

1. A method, comprising:
   receiving a user input requesting that an initial application container compatible with a first programming model be modified to generate an adjusted application container compatible with a second programming model, the second programming model being different from the first programming model;
   determining a first set of development artifacts for the initial application container;
   automatically adjusting a first subset of the first set of development artifacts to enable compatibility with the second programming model;
   automatically generating one or more behavior definitions associated with the automatically adjusted first subset; and
   generating the adjusted application container comprising the initial application container and the one or more behavior definitions.

2. The method of claim 1, further comprising integrating, at runtime, the automatically adjusted first subset via an adapter.

3. The method of claim 1, wherein the first programming model comprises Advanced Business Application Programming Model for SAP Fiori™.

4. The method of claim 1, wherein the second programming model comprises Advanced Business Application Programming RESTful Application Programming Model™.

5. The method of claim 1, further comprising presenting an option to perform a simulated migration to simulate generation of the adjusted application container.

6. The method of claim 1, further comprising providing a selectable wizard to manage automatic adjustment of the first subset of the first set of development artifacts.

7. The method of claim 1, further comprising performing a preprocessing operation to determine potential incompatibilities and restriction prior to automatically adjusting the first subset of the first set of development artifacts.

8. The method of claim 1, further comprising persisting the automatically adjusted first subset and the one or more behavior definitions associated with the automatically adjusted first subset in a storage device.

9. The method of claim 1, further comprising generating a migration log to indicate steps performed between accessing the initial application container and generating the adjusted application container.

10. The method of claim 9, further comprising displaying the migration log on a user interface of a computing device.

11. An article, comprising:
    a non-transitory storage medium comprising machine-readable instructions executable by a processor to perform:
       processing a user input requesting that an initial application container compatible with a first programming model be modified to generate an adjusted application container compatible with a second programming model, the second programming model being different from the first programming model;
       determining a first set of development artifacts for the initial application container;
       automatically adjusting a first subset of the first set of development artifacts to enable compatibility with the second programming model;
       automatically generating one or more behavior definitions associated with the automatically adjusted first subset; and
       generating the adjusted application container comprising the initial application container and the one or more behavior definitions.

12. The article of claim 11, wherein the machine-readable instructions are further executable by the processor to perform integrating, at runtime, the automatically adjusted first subset via an adapter.

13. The article of claim 11, wherein the second programming model comprises Advanced Business Application Programming RESTful Application Programming Model™.

14. The article of claim 11, wherein the machine-readable instructions are further executable by the processor to present an option to perform a simulated migration to simulate generation of the adjusted application container.

15. The article of claim 11, wherein the machine-readable instructions are further executable by the processor to generate a migration log to indicate steps performed between accessing the initial application container and generating the adjusted application container.

16. The article of claim 15, wherein the machine-readable instructions are further executable by the processor to display the migration log on a user interface of a computing device.

17. The article of claim 11, wherein the machine-readable instructions are further executable by the processor to provide a selectable wizard to manage automatic adjustment of the first subset of the first set of development artifacts.

18. A system comprising:
    a receiver to receive a user input;
    at least one programmable processor;
    a non-transitory machine-readable medium storing instructions that, when executed by the at least one programmable processor, cause the at least one programmable processor to perform operations comprising:
  processing the user input requesting that an initial application container compatible with a first programming model be modified to generate an adjusted application container compatible with a second programming model, the second programming model being different from the first programming model;
  determining a first set of development artifacts for the initial application container;
  automatically adjusting a first subset of the first set of development artifacts to enable compatibility with the second programming model;
  automatically generating one or more behavior definitions associated with the automatically adjusted first subset; and
  generating the adjusted application container comprising the initial application container and the one or more behavior definitions; and
an adapter to integrate, at runtime, the automatically adjusted first subset.

19. The system of claim 18, wherein the second programming model comprises Advanced Business Application Programming RESTful Application Programming Model™.

20. The system of claim 18, wherein the instructions are further executable by the at least one programmable processor to perform at least one additional operation comprising generating a migration log to indicate steps performed between accessing the initial application container and generating the adjusted application container.

* * * * *